Jan. 17, 1956 R. HELL 2,731,322

RECORDING DEVICES

Filed Dec. 14, 1950

2 Sheets-Sheet 1

Inventor.
Rudolf Hell.
By. [signature] Atty.

Jan. 17, 1956 R. HELL 2,731,322

RECORDING DEVICES

Filed Dec. 14, 1950 2 Sheets-Sheet 2

Inventor:
Rudolf Hell.
By [signature]
Att'y.

United States Patent Office 2,731,322

Patented Jan. 17, 1956

2,731,322

RECORDING DEVICES

Rudolf Hell, Kiel-Dietrichsdorf, Germany

Application December 14, 1950, Serial No. 200,721

5 Claims. (Cl. 346—116)

This invention is concerned with recording devices. The term "recording devices" is intended to mean devices such, for example, as measuring instruments, remote indicating instruments, telegraph apparatus, recorders and the like.

It is important in such devices to make the stylus member and its actuating elements as light as possible and to carry out the recording or printing operation in a manner that causes little friction. Automatically operating stylus members, which are actuated relative to moving recording tapes or the like, usually have a considerable mass and therefore correspondingly great inertia. The frictional forces may be kept low in the case of devices using pen stylus members, but sharpness of recording is in such cases low and for many purposes insufficient.

It is known to use hard- or sharply pointed stylus members which move relative to the recording tape and to carry out the recording by means of carbon paper, inked ribbon or the like, which is pressed against the recording tape by the stylus. However, such structures require relatively great pressure forces, thus increasing friction and therewith the inertia of the system.

The object of the invention is to provide a recording device of the above indicated type which is adapted to produce a sharp and distinct record. This object is realized by the provision of a stylus member having its printing point in permanent engagement with the recording tape, and means for moving such stylus in a direction perpendicular to the plane of motion of the tape to effect the printing thereon, the arrangement being such that friction and inertia are reduced to a minimum.

In accordance with the invention, there is provided a printing roller which is continuously inked by an inking device. The recording tape is guided over and supported by stationary guide members forming guide surfaces which may be disposed on the side which coincides with the position of the printing point of the stylus. These guide surfaces hold the recording tape slightly spaced from the printing roller.

The above indicated arrangement requires displacement of the recording tape against the printing roller by the stylus only to the extent of the fixed space determined by the stationary guide surfaces. Only a slight pressure of the stylus is required, since the impression of the inked printing roller is easily accomplished upon the recording tape. The frictional forces are correspondingly slight. These frictional forces may be further reduced, if desired, by forming the stylus in the manner of a small printing disk or wheel disposed at the end of the stylus-actuating element. The frictional component which is caused by the advance of the recording tape is thereby practically wholly eliminated so that it is necessary to overcome only the gliding friction of the slower motion of the disklike stylus member in a direction transverse to the plane of the recording tape.

In accordance with one embodiment of the invention, the inking device comprises an inking roller and an intermediate transmitter roller. The use of the latter accomplishes a particularly uniform inking of the printing roller.

The stationary guide surfaces for the recording tape are suitably formed by two bars or rail-like members. So far as the principle of operation is concerned, these guide surfaces may be disposed on either side of the recording tape. If they are disposed on the side coinciding with the position of the printing point of the stylus, the elastic tension of the recording tape against which the stylus must be moved will be less than if they are disposed on the other side, because the stylus moves the recording tape in a direction away from the guide surfaces. Such an arrangement is particularly suitable if the stylus and the printing roller are disposed perpendicularly one above the other, and if the printing edge or point of the stylus presses upwardly against the recording tape.

The stylus may be actuated in one of several ways. For example, it may be connected directly or indirectly with a rotary coil driving system and may execute an arcuate swinging motion transverse or crosswise of the recording tape; or it may be made in the form of a reciprocating element and actuated by a magnetic system comprising an axially movable coil. Swinging or rotating motions may also be obtained by suitable mechanical gearing or translating means under the control of a suitable magnetic drive system. If desired, two such drive systems may be used which are connected in opposition symmetrical to one another and coupled with each other in such a manner as to impart to the stylus twice the driving power exerted singly by each.

The friction of the stylus in engagement with the recording tape is, in accordance with the invention, further reduced by forming it as a rotary body provided with a narrow edge forming the printing point, together with suitable drive means for rotating such body. A continuous recording curve is thus drawn upon the recording tape, while the printing edge or point of the stylus member unrolls relative to the printing roller.

A modified embodiment contemplates a stylus member forming a printing spiral which is rotated around its axis. This spiral unrolls likewise relative to the printing roller.

Still another embodiment of the invention contemplates the use of a stylus made in the form of a disklike rotatable member which is actuated by a rotating device capable of oscillating within angular limits. Such disklike member is rotatably disposed upon a shaft at a predetermined angle thereto and also executes an unrolling motion relative to the printing roller.

In order to make it possible to scan relatively wide recording tapes, it may under certain circumstances be desirable to provide a drive system having means for determining the amplitude of the stylus. The invention provides, in accordance with a further embodiment, link means, especially a quadrangular link chain, angular link means or other suitable gearing, between the stylus and the drive system therefor, which may be a rotary coil system or a system having an axially movable coil, so as to obtain desired amplitudes and geometric forms of the motion of the stylus.

The objects noted above and additional objects and features will appear from the detailed description of certain embodiments which will presently be rendered with reference to the accompanying drawings. In these drawings, Fig. 1 shows in diagrammatic representation a recording apparatus embodying the invention;

Figs. 2 to 4 indicate on somewhat enlarged scale details of the apparatus shown in Fig. 1, namely, in Fig. 2 a view of the inking and printing rollers and the stylus and tape; in Fig. 3 a view of the parts of Fig. 2 from the side, with the rollers in section; and Fig. 4 a plan view of the tape with the stylus lever underneath and at the right a plan view of the drive mechanism;

Fig. 5 indicates a modified stylus and cooperating parts;

Figure 1:
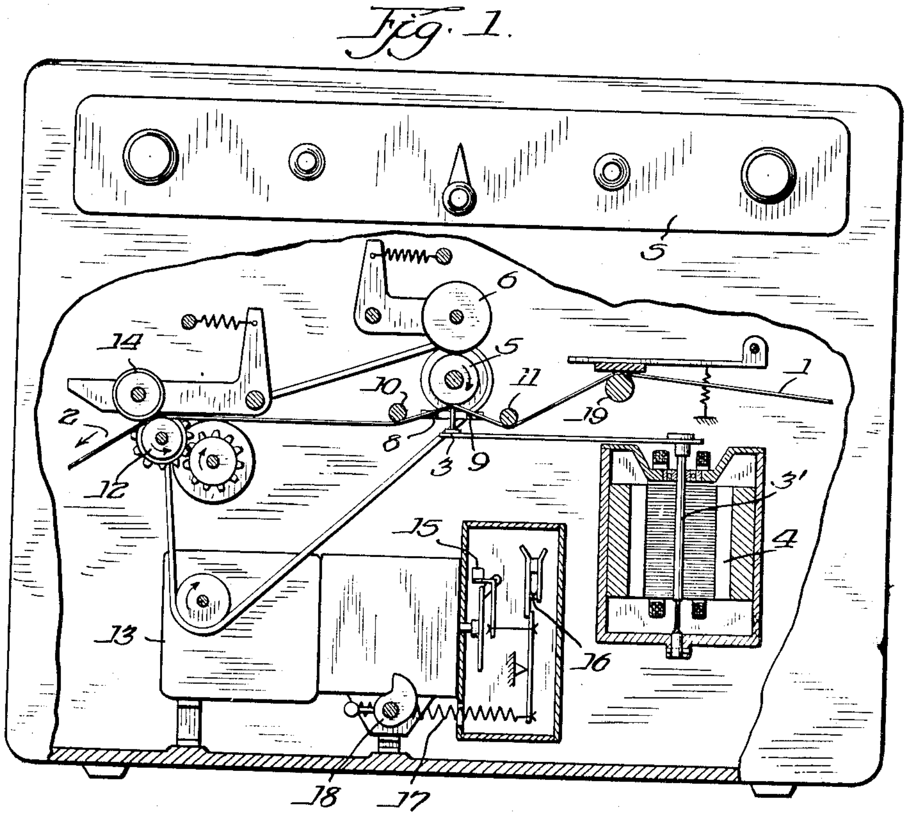
Figure 4:
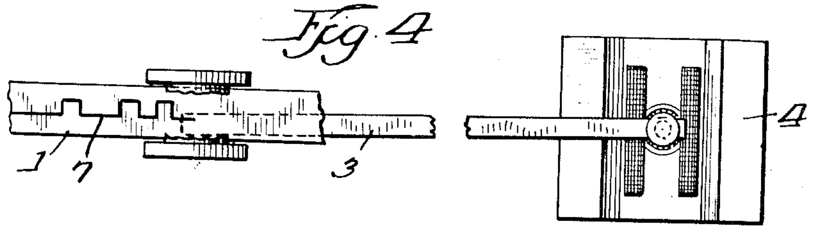
Figure 3:
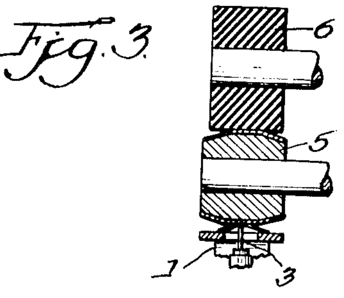
Figure 2:
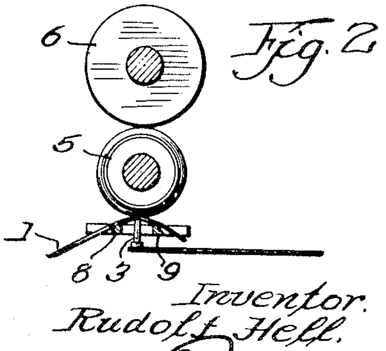

In Figs. 1 and 2, numeral 1 indicates the recording tape. Underneath this tape is disposed the stylus 3, its operative displacement being in a direction perpendicular to the plane of motion of the recording tape. The stylus 3 executes a swinging angular motion under the control of a rotary coil instrument 4 which receives the signals corresponding to the momentary values to be recorded on the tape 1.

In accordance with the invention, there is provided above the recording tape 1 a printing roller 5, the axis of which extends in parallel with the plane of the tape 1. The roller 5 is continuously inked by the inking roller 6 and is thus adapted to mark on the recording tape 1 the impressions 7 which correspond to the places at which the tape is pressed against the roller 5 by the stylus 3. The tape 1 is supported by two stationary barlike guide members 8 and 9 in order to reduce the required pressure and frictional forces. The members 8 and 9 are arranged symmetrical to the stylus 3 and hold the recording tape 1 slightly spaced from the printing roller 5. Only this slight spacing need be overcome by the upward pressure of the stylus member 3. The configuration of the members 8 and 9, is particularly apparent from Fig. 2.

The tape 1 is also guided by idler rollers 10 and 11 in addition to the barlike guide members 8 and 9. The tape is driven by a drive roller 12 from a motor 13. The drive roller 12 coacts with the idler roller 14 and pulls the tape in the direction of the arrow 2. The motor 13 also drives the printing roller 5 which coacts with the inking roller 6. Numeral 19 indicates a roller coacting with a counterplate and forming therewith a brake device for holding the tape 1 under the required tension.

The motor 13 is provided with a centrifugal governor comprising a pivotally disposed flyweight 15 which rotates with the motor shaft by an arm rotated thereby and coacts with suitable coaxially disposed transmission means to actuate a pivotally mounted lever, one end of which is adapted to actuate contact spring means 16. The force which counteracts the action of the flyweight 15 comprises a spring 17 one end of which engages the pivotally mounted lever and whose tension may be adjusted as desired, by means of a cam 18. The centrifugal governor therefor provides for a flyweight which operates, on the one hand, against contact spring means and coacts, on the other hand, with a tension spring over a transmission means which is disposed coaxial with the motor shaft, the tension spring being fixedly disposed relative to the rotating parts and exerting its force upon the flyweight over the coaxial transmission means. The transmission means is preferably a connecting member journalled in ball bearings. The speed of the motor is by this arrangement easily adjusted from the outside, since the tension spring 17 is in fixed position. The handle for adjusting the spring tension is connected with one end of the spring 17 over a suitable gearing, especially over a cam disk, as shown, the curve of the cam disk having the form of a square function. Suitable means are provided for coaction with the cam 18 against which the cam curve is backed when the cam is rotated by the actuation of its associated handle so as to displace the anchor point of the tension spring accordingly.

The shaft 3′ of the instrument 4 forming the actuating means for the stylus 3 is journalled in ball bearings at its upper end, and its lower end forms a torsional pin which is fixedly mounted in the frame of the instrument. The stylus 3 may be provided with a hard and sharp point made of a jewel.

The letter "S" in the top portion of Fig. 1 indicates a panel comprising desired and suitable terminal, switching, signalling and control means.

Figure 6:
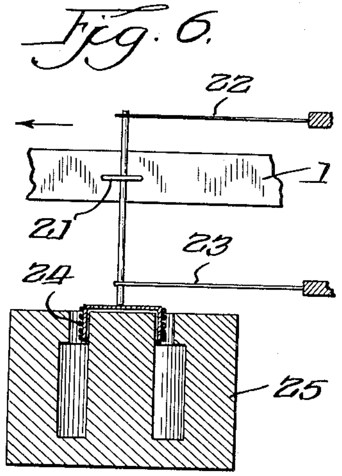
Fig. 6 shows the drive for the stylus indicated in Fig. 5.
Figure 5:
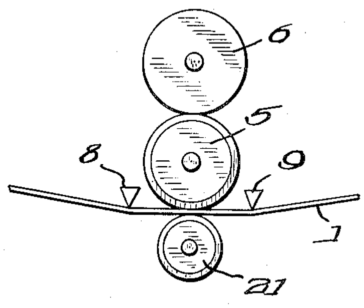

Fig. 5 shows another embodiment of the stylus and its actuating elements, as seen from the bottom of the recording tape, and Fig. 6 indicates certain parts thereof, as seen in vertical sectional view.

The stylus is in this embodiment made in the form of a disk- or wheel-like member 21 which is journalled between two springs 22 and 23. This manner of journalling also constitutes a linear guide means, permitting an oscillating motion of the stylus 21 perpendicular to the plane of motion of the tape 1. The oscillating motion is controlled by a coil 24 which moves axially within the air gap of a magnet 25.

In Fig. 5 numerals 8 and 9 designate again the two stationary guide members which are as seen in Fig. 6 disposed above the recording tape 1. The printing roller 5 is inked directly by the inking roller 6, as before.

Figure 7:
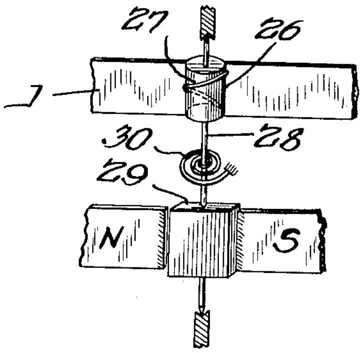
Figs. 7 and 8 illustrate further embodiments of stylus members and parts cooperating therewith.

The stylus of the structure shown in Fig. 7 comprises a stylus roller 26 carrying a spiral member 27. The spiral member has one thread and serves as a stylus printing edge which unrolls relative to the printing roller, the latter being omitted from the figure, while the stylus roller 26 is rotated around its axis. The rotation of the stylus roller 26 is effected by a suitable rotary coil instrument shown diagrammatically as comprising the pole pieces N and S and the frame 29. A shaft 28 connects the roller 26 with the frame 29, as shown. Numeral 30 indicates a spiral spring for biasing the rotary parts including the frame 29 in normal position.

Figure 8:
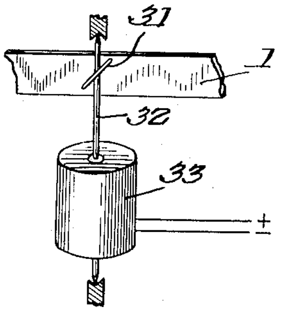

Fig. 8 indicates in diagrammatic manner a modification of the embodiment shown in Fig. 7. In place of the spirally shaped stylus edge 27, there is in this case a stylus made in the form of a circular disk 31 having a sharp edge. This disk is disposed upon a shaft 32 coacting with a suitable instrument 33 which is adapted to impart, within a certain angle, an arcuate oscillating motion to the shaft 32, thereby causing the edge of the disk 31 to unroll relative to the printing roller 5 which is in back of the recording tape 1. This latter embodiment is particularly adapted to operate as a Morse printer.

It is understood that the element on which a record is to be impressed need not necessarily be a tape, and this term therefore is to be interpreted as including strip- or sheetlike elements.

Changes may be made within the scope and spirit of the accompanying claims.

I claim:

1. A recording device comprising a recording tape and means for moving said tape, a printing roller disposed on one side of said tape with the axis thereof extending perpendicular to the direction of the motion of the tape, a roller for continuous inking coaction with said printing roller, a pair of idler rollers in engagement with said tape on the side thereof which faces said printing roller, stationary guide means disposed intermediate of said pair of idler rollers on the side of said tape which faces away from said printing roller for holding said tape slightly spaced therefrom substantially solely throughout a limited area in which recordings are effected thereon, said stationary guide means forming a gap extending on either side of an imaginary center line which intersects the axis of said printing roller, a stylus extending with its axis along said imaginary center line on the side of said tape which faces away from said printing roller and projecting through said gap with its inner printing end in permanent engagement with said tape to hold said tape at the corresponding point of engagement therewith in contact with said printing roller, the inner walls of said guide means forming said gap being in close proximity to said stylus, and operating means for actuating said stylus to move it in a direction perpendicular to the direction of the motion of said tape to cause the inner printing end of said stylus to print corresponding impressions on said tape.

2. The structure and co-operation of parts as set forth in claim 1, wherein said stationary guide means comprises a pair of barlike stationary members.

3. The structure and co-operation of parts as set forth in claim 1, wherein said imaginary center line intersects the axes of said printing roller and of the roller for continuous inking coaction therewith.

4. The structure and co-operation of parts as set forth in claim 1, wherein said tape moves at the area of coaction with said stylus in a generally horizontal plane, said inking roller being disposed above said tape and said guide means and stylus being disposed below said tape.

5. The structure and co-operation of parts as set forth in claim 1, comprising a pinlike member which constitutes said stylus for pinpoint coaction with said recording tape.

References Cited in the file of this patent

UNITED STATES PATENTS

| | | |
|---|---|---|
| 859,673 | Lennox et al. | July 9, 1907 |
| 1,275,234 | Elsom | Aug. 13, 1918 |
| 2,044,586 | Marcellus | June 16, 1936 |
| 2,280,613 | Arey | Apr. 21, 1942 |
| 2,341,652 | Rey | Feb. 15, 1944 |
| 2,397,535 | Cooley | Apr. 2, 1946 |
| 2,504,126 | Howe | Apr. 18, 1950 |

FOREIGN PATENTS

| | | |
|---|---|---|
| 11,106 | Great Britain | May 13, 1904 |